(12) United States Patent
Nagai

(10) Patent No.: US 11,645,177 B2
(45) Date of Patent: May 9, 2023

(54) DIAGNOSIS CIRCUIT FOR MAKING A DIAGNOSIS OF A MULTIPLEXER

(71) Applicant: Panasonic Intellectual Property Management Co., Ltd., Osaka (JP)

(72) Inventor: Masaaki Nagai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/584,942

(22) Filed: Jan. 26, 2022

(65) Prior Publication Data

US 2022/0245039 A1   Aug. 4, 2022

(30) Foreign Application Priority Data

Feb. 1, 2021   (JP) ............................. JP2021-014595

(51) Int. Cl.
*G06F 11/26* (2006.01)
(52) U.S. Cl.
CPC .................................. *G06F 11/26* (2013.01)
(58) Field of Classification Search
CPC ....................................................... G06F 11/26
See application file for complete search history.

(56) References Cited

U.S. PATENT DOCUMENTS

| | | | | |
|---|---|---|---|---|
| 5,216,673 A * | 6/1993 | Kanai | ..................... | G11C 29/56 |
| | | | | 714/719 |
| 7,451,373 B2 * | 11/2008 | Poehl | ............... | G01R 31/31813 |
| | | | | 714/740 |
| 2010/0271063 A1 * | 10/2010 | Hasegawa | ............... | G11C 29/56 |
| | | | | 324/756.04 |
| 2015/0124910 A1 * | 5/2015 | Van Kampen | ........ | H04L 5/0001 |
| | | | | 375/340 |
| 2018/0024201 A1 * | 1/2018 | Izawa | ....................... | B60L 3/12 |
| | | | | 324/434 |
| 2018/0052198 A1 * | 2/2018 | Douskey | ........ | G01R 31/318541 |

(Continued)

FOREIGN PATENT DOCUMENTS

EP           0671633 A2 *   9/1995
JP         2015-142431 A     8/2015

(Continued)

*Primary Examiner* — Matthew M Kim
*Assistant Examiner* — Indranil Chowdhury
(74) *Attorney, Agent, or Firm* — McDermott Will & Emery LLP

(57) ABSTRACT

A diagnosis circuit makes a diagnosis of a first multiplexer. The first multiplexer receives input data elements, selects one of the input data elements, and outputs the selected one as a selected data element. The diagnosis circuit includes a comparator unit and a second multiplexer. The comparator unit compares each of the input data elements to be supplied to the first multiplexer with the selected data element provided by the first multiplexer. The second multiplexer receives comparative data elements corresponding one to one to results of comparison made by the comparator unit with respect to the input data elements and outputs, out of the comparative data elements, a comparative data element, including a result of comparison between the one input data element selected by the first multiplexer and the selected data element, as a result data element.

8 Claims, 3 Drawing Sheets

(56) References Cited

U.S. PATENT DOCUMENTS

2020/0019374 A1\* 1/2020 Prathapan ............... G06F 5/065
2020/0049763 A1\* 2/2020 Yamada ........... G01R 31/31725
2022/0019407 A1\* 1/2022 Chih .................... G11C 7/1012

FOREIGN PATENT DOCUMENTS

| JP | 2017207363 A | \* | 11/2017 | |
|---|---|---|---|---|
| KR | 100679324 B1 | \* | 2/2007 | |
| WO | WO-8904519 A1 | \* | 5/1989 | |
| WO | WO-9320457 A1 | \* | 10/1993 | ....... G01R 31/31922 |
| WO | WO-0127761 A2 | \* | 4/2001 | ..... G01R 31/318541 |
| WO | WO-01080429 A1 | \* | 10/2001 | |

\* cited by examiner

DIAGNOSIS CIRCUIT FOR MAKING A DIAGNOSIS OF A MULTIPLEXER

CROSS-REFERENCE TO RELATED APPLICATIONS

The present application is based upon, and claims the benefit of priority to, Japanese Patent Application No. 2021-014595, filed on Feb. 1, 2021, the entire contents of which are hereby incorporated by reference.

TECHNICAL FIELD

The present disclosure generally relates to a diagnosis circuit, an electronic device, and a diagnosis method. More particularly, the present disclosure relates to a diagnosis circuit for making a diagnosis of a multiplexer, an electronic device including the diagnosis circuit, and a diagnosis method to be used by the diagnosis circuit.

BACKGROUND ART

JP 2015-142431 A discloses a storage battery monitoring device for monitoring a storage battery in which a plurality of battery cells are connected in series. The storage battery monitoring device of JP 2015-142431 A turns a plurality of balancing switches to make any one of the plurality of battery cells discharging while keeping the other battery cells discharging suspended. In this state, the storage battery monitoring device makes a balancing multiplexer sequentially select one of a plurality of discharge paths after another and also makes a differential amplifier and an A/D converter measure the voltage across each of the plurality of balancing switches. Then, the storage battery monitoring device compares the measured value of the voltage across each balancing switch with a predetermined expected value. Based on the result of the comparison, the storage battery monitoring device determines whether or not the balancing multiplexer is operating properly.

SUMMARY

In a situation where a diagnosis is made to determine whether or not a multiplexer (balancing multiplexer) is operating properly as in the storage battery monitoring device of JP 2015-142431 A, the diagnosis may also be made using another multiplexer (hereinafter referred to as a "diagnostic multiplexer") of the same type of the multiplexer subjected to the diagnosis (hereinafter referred to as a "target multiplexer"). In that case, a determination may be made, by seeing if the respective outputs of the two multiplexers agree with each other, whether or not the target multiplexer is operating properly.

Meanwhile, recently, there have been growing demands for further increasing the definition and resolution of an electronic device (such as a sensor) that uses such a multiplexer. In addition, the number of bits of data to be processed by digital signal processing in the electronic device is also on the rise. Besides, in digital signal processing, as the computational complexity further increases to realize an even higher definition, the number of data elements to process and the number of multiplexers for use to select data also increase. Consequently, the larger the number of bits of data and the number of data elements to be processed by each multiplexer are, the larger the size of the multiplexer tends to be.

Therefore, according to the diagnosis method of JP 2015-142431 A described above, if a multiplexer of the same type as the target multiplexer is used as the diagnostic multiplexer, then the size of the diagnostic multiplexer has to be increased as the number of bits of data and the number of data elements to be processed by the target multiplexer increase. As a result, the size of a diagnosis circuit including the diagnostic multiplexer has to be increased as well.

The present disclosure provides a diagnosis circuit, an electronic device, and a diagnosis method, all of which are configured or designed to contribute to downsizing.

A diagnosis circuit according to an aspect of the present disclosure is configured to make a diagnosis of a first multiplexer. The first multiplexer receives a plurality of input data elements, selects one input data element out of the plurality of input data elements, and outputs the one input data element as a selected data element. The diagnosis circuit includes a comparator unit and a second multiplexer. The comparator unit compares each of the plurality of input data elements to be supplied to the first multiplexer with the selected data element provided by the first multiplexer. The second multiplexer receives a plurality of comparative data elements corresponding one to one to a plurality of results of comparison made by the comparator unit with respect to the plurality of input data elements and outputs, out of the plurality of comparative data elements, a comparative data element, including a result of comparison between the one input data element selected by the first multiplexer and the selected data element, as a result data element.

An electronic device according to another aspect of the present disclosure includes the diagnosis circuit described above and the first multiplexer described above.

A diagnosis method according to still another aspect of the present disclosure is a method for making a diagnosis of a multiplexer using a diagnosis circuit. The multiplexer receives a plurality of input data elements, selects one input data element out of the plurality of input data elements, and outputs the one input data element as a selected data element. The diagnosis method includes a comparison step and an output step. The comparison step includes making the diagnosis circuit compare each of the plurality of input data elements to be supplied to the multiplexer with the selected data element provided by the multiplexer. The output step includes making the diagnosis circuit output, out of a plurality of comparative data elements corresponding one to one to a plurality of results of comparison made in the comparison step with respect to the plurality of input data elements, a comparative data element, including a result of comparison between the one input data element selected by the multiplexer and the selected data element, as a result data element.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Embodiments (1) Overview

Figure 1:
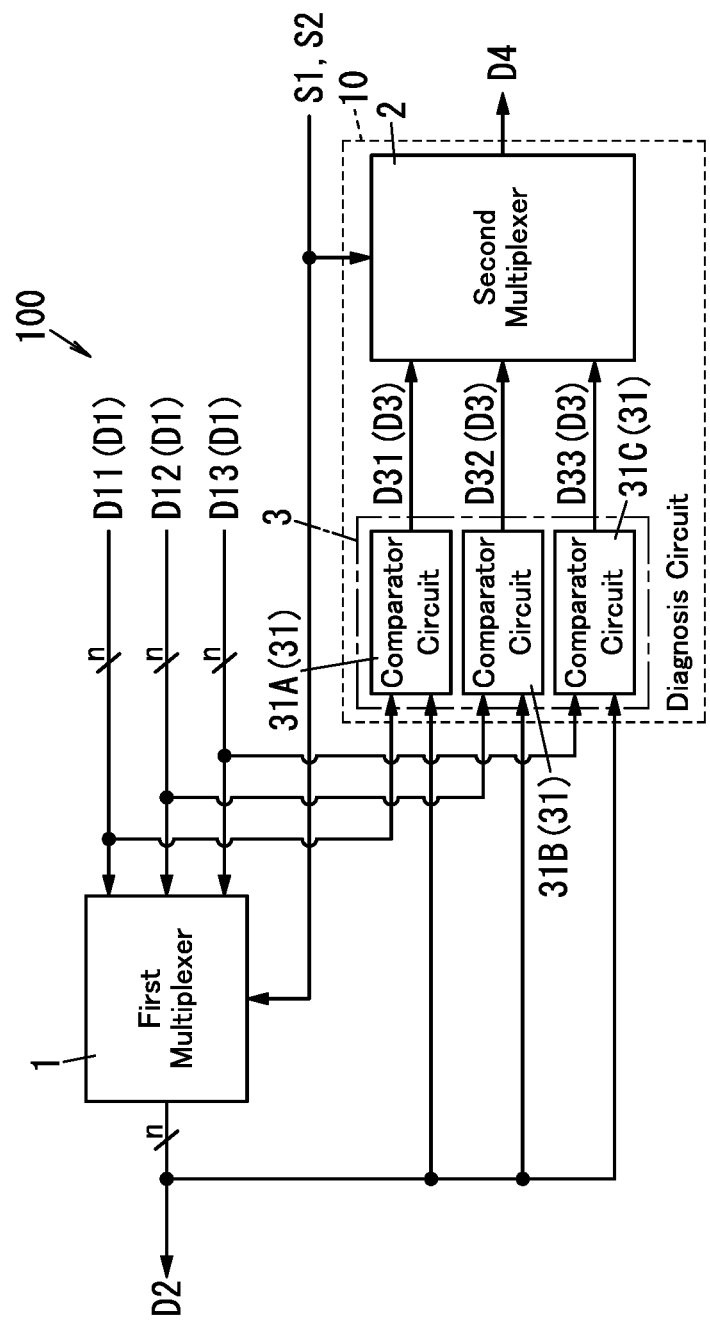
FIG. 1 illustrates a schematic configuration for an electronic device including a diagnosis circuit according to an exemplary embodiment.

First, an overview of a diagnosis circuit 10 and electronic device 100 according to an exemplary embodiment will be described with reference to FIG. 1.

A diagnosis circuit 10 according to an exemplary embodiment may be used in an electronic device 100. The electronic device 100 may be, for example, an acceleration sensor for detecting acceleration or an angular velocity sensor (gyrosensor) for detecting an angular velocity. In this embodiment, the electronic device 100 may be implemented as an acceleration sensor, for example. The electronic device 100 includes a first multiplexer 1 and the diagnosis circuit 10 as shown in FIG. 1. The first multiplexer 1 receives a plurality of (e.g., three) input data elements D1 and selectively outputs one of the plurality of input data elements D1 as a selected data element D2. Each of the plurality of input data elements D1 and the selected data element D2 is data of n1 bits, where n1 is a natural number equal to or greater than 2 and may be 20, for example. That is to say, in the diagnosis circuit 10 according to an exemplary embodiment, each of the plurality of input data elements D1 and the selected data element D2 is data of 20 bits.

The diagnosis circuit 10 may be used to make a failure diagnosis of the first multiplexer 1, for example. The diagnosis circuit 10 includes a comparator unit 3 and a second multiplexer 2 as shown in FIG. 1. The comparator unit 3 includes a plurality of (e.g., three) comparator circuits 31. In the diagnosis circuit 10 according to this embodiment, the plurality of comparator circuits 31 correspond one to one to the plurality of input data elements D1. That is to say, in the diagnosis circuit 10 according to this embodiment, the number of the input data elements D1 is the same as that of the comparator circuits 31.

Each of the plurality of comparator circuits 31 compares a corresponding one of the plurality of input data elements D1 with the selected data element D2 and outputs a comparative data element D3 indicating the result of comparison. That is to say, the comparator unit 3 compares each of the plurality of input data elements D1 to be supplied to the first multiplexer 1 with the selected data element D2 provided by the first multiplexer 1. The second multiplexer 2 receives a plurality of (e.g., three) comparative data elements D3 and outputs, out of the plurality of comparative data elements D3, a comparative data element D3, including a result of comparison between the one input data element D1 selected by the first multiplexer 1 and the selected data element D2, as a result data element D4. The plurality of comparative data elements D3 correspond one to one to a plurality of results of comparison made by the comparator unit 3 with respect to the plurality of input data elements D1. The plurality of comparative data elements D3 and the result data element D4 are obtained as a result of comparison between the plurality of input data elements D1 and the selected data element D2 and are each data of n2 bits, where n2 is a natural number smaller than n1 and may be 1, for example. That is to say, in the diagnosis circuit 10 according to this embodiment, each of the plurality of comparative data elements D3 and the result data element D4 is data of 1 bit.

For example, the comparative data element D3 may be 0 if the input data element D1 agrees with the selected data element D2 and may be 1 unless the input data element D1 agrees with the selected data element D2. Alternatively, the comparative data element D3 may be 1 if the input data element D1 agrees with the selected data element D2 and may be 0 unless the input data element D1 agrees with the selected data element D2.

In the diagnosis circuit 10 and electronic device 100 according to this embodiment, the second multiplexer 2 outputs, out of the plurality of comparative data elements D3 received, a comparative data element D3, including the result of comparison between the input data element D1 selected by the first multiplexer 1 and the selected data element D2, as the result data element D4 as described above. Each of the plurality of comparative data elements D3 is data of n2 bits, where n2 is smaller than n1. Thus, compared to supplying the plurality of input data elements of n1 bits to the second multiplexer and comparing the output of the first multiplexer with the output of the second multiplexer, the size of the second multiplexer may be reduced. Consequently, this may contribute to reducing the size of the diagnosis circuit 10 including the second multiplexer 2 and eventually, the overall size of the electronic device 100 including the diagnosis circuit 10.

(2) Details

Next, a configuration for the diagnosis circuit 10 and electronic device 100 according to this embodiment will be described in detail with reference to FIGS. 1 and 2.

The electronic device 100 according to this embodiment includes the first multiplexer 1 and the diagnosis circuit 10 as described above. In addition, the electronic device 100 further includes a printed wiring board on which the first multiplexer 1 and the diagnosis circuit 10 are mounted. That is to say, on the printed wiring board, the plurality of comparator circuits 31 and the second multiplexer 2 that form the diagnosis circuit 10 are also mounted.

(2.1) First Multiplexer

The first multiplexer 1 receives a plurality of input data elements D1, selects one input data element D1 out of the plurality of input data elements D1, and outputs the one input data element D1 as a selected data element D2 as described above. The number of the input data elements D1 is m, where m is a natural number equal to or greater than 2 and may be 3, for example. That is to say, in the electronic device 100 according to this embodiment, the number of the input data elements D1 is three. Specifically, in the electronic device 100 according to this embodiment, the first multiplexer 1 receives three input data elements D1, selects one of the three input data elements D1 received, and outputs the one input data element D1 as a selected data element D2. The first multiplexer 1 selects an input data element D1 to be output as the selected data element D2 from the plurality of input data elements D1 in response to select signals S1, S2. The select signals S1, S2 may be supplied from, for example, a control circuit provided outside of the electronic device 100.

Each of the plurality of input data elements D1 is data of n1 bits as described above. Each of the plurality of input data elements D1 may be data of 20 bits, for example. Thus, the selected data element D2 provided by the first multiplexer 1 is also data of 20 bits. The selected data element D2 may be supplied from the first multiplexer 1 to, for example, an arithmetic circuit to calculate either acceleration or an angular velocity. In the following description, if the plurality of input data elements D1 need to be distinguished from each other, the plurality of input data elements D1 will be hereinafter designated by the reference signs D11, D12, and D13, respectively. Note that the circuit configuration of the first multiplexer 1 may be the same as that of the second multiplexer 2 to be described later and description thereof will be omitted herein.

Each of the plurality of input data elements D1 includes, for example, sensor data, a correction coefficient, a filter coefficient, control data, and processing data. The sensor data may be three-axis (X-, Y-, and Z-axis) acceleration data. The correction coefficient is a coefficient for correcting the acceleration data. The filter coefficient is a coefficient for removing noise components from the acceleration data. The control data is data for use to control the arithmetic circuit described above and other circuits. The processing data is data required for the electronic device's 100 processing.

(2.2) Diagnostic Circuit

The diagnosis circuit 10 includes the comparator unit 3 and the second multiplexer 2 as described above. The comparator unit 3 includes a plurality of comparator circuits 31 as described above.

Figure 2:
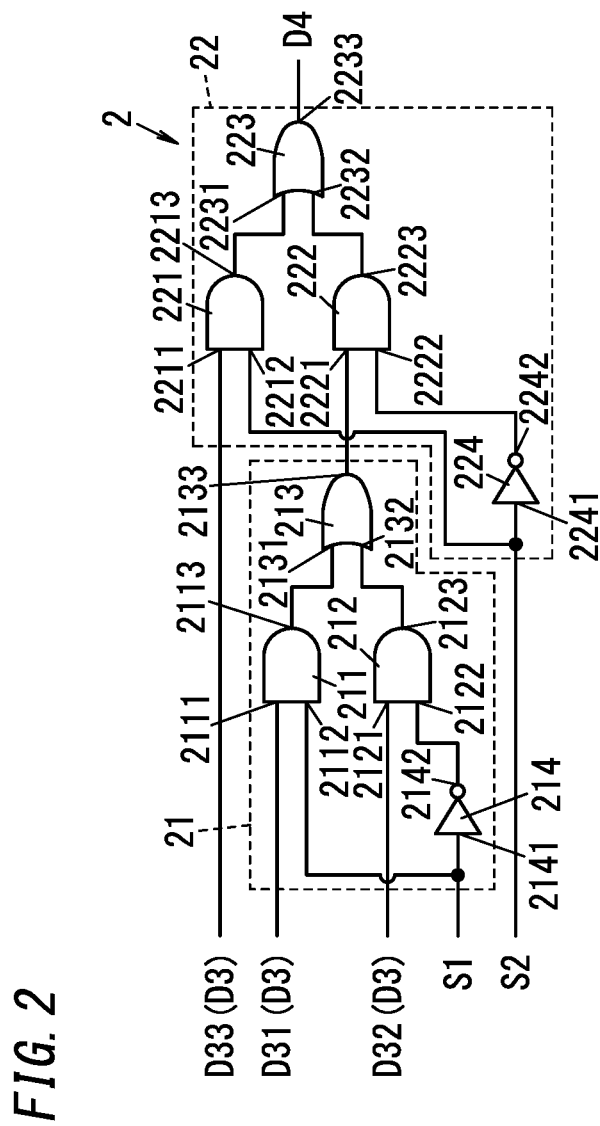
FIG. 2 is a schematic circuit diagram illustrating an exemplary second multiplexer included in the diagnosis circuit.

Each of the plurality of comparator circuits 31 is a circuit for comparing an input data element D1 with the selected data element D2 as shown in FIG. 1. As described above, each of the input data elements D1 and the selected data element D2 is data of n1 bits. Thus, each of the plurality of comparator circuits 31 is made up of (2×n1−1) EXOR (exclusive-OR) circuits. In the diagnosis circuit 10 according to this embodiment, each of the input data elements D1 and the selected data element D2 is data of 20 bits and each of the plurality of comparator circuits 31 is made up of 39 EXOR circuits. Each of the plurality of comparator circuits 31 outputs a comparative data element D3 indicating the result of comparison between a corresponding input data element D1 and the selected data element D2. The comparative data element D3 is data of 1 bit as described above. The comparative data element D3 is supplied from each of the comparator circuits 31 to the second multiplexer 2. In the following description, if the plurality of comparator circuits 31 need to be distinguished from each other, the plurality of comparator circuits 31 will be hereinafter designated by the reference signs 31A, 31B, and 31C, respectively.

As described above, the second multiplexer 2 receives a plurality of comparative data elements D3 corresponding one to one to the plurality of results of comparison made by the comparator unit 3 and outputs, out of the plurality of comparative data elements D3, a comparative data element D3, including a result of comparison between the one input data element D1 selected by the first multiplexer 1 and the selected data element D2, as a result data element D4. In the diagnosis circuit 10 according to this embodiment, the number of the comparative data element D3 is three. That is to say, in the diagnosis circuit 10 according to this embodiment, the second multiplexer 2 outputs a comparative data element D3, selected from the three comparative data elements D3, as a result data element D4. The second multiplexer 2 selects the comparative data element D3 to be output as the result data element D4 from the plurality of comparative data elements D3 in response to the select signals S1, S2. That is to say, in the electronic device 100 according to this embodiment, the select signals S1, S2 supplied to the first multiplexer 1 when the selected data element D2 is selected from the plurality of input data elements D1 are the same as the select signals S1, S2 supplied to the second multiplexer 2 when the result data element D4 is selected from the plurality of comparative data elements D3. Each of the plurality of comparative data elements D3 is data of 1 bit as described above. Thus, the result data element D4 provided by the second multiplexer 2 is also data of 1 bit. In the following description, if the plurality of comparative data elements D3 need to be distinguished from each other, the plurality of comparative data elements D3 will be hereinafter designated by D31, D32, and D33, respectively.

(2.3) Circuit Configuration for Second Multiplexer

Next, a circuit configuration for the second multiplexer 2 will be described with reference to FIG. 2.

As described above, the second multiplexer 2 receives three comparative data elements D3 and outputs, out of the three comparative data elements D3 received, a comparative data element D3, including a result of comparison between the one input data element D1 selected by the first multiplexer 1 and the selected data element D2, as a result data element D4. Also, each of the three comparative data elements D3 is data of 1 bit as described above. Thus, in the diagnosis circuit 10 according to this embodiment, the second multiplexer 2 is made up of two unit circuits 21, 22 as shown in FIG. 2. The unit circuit 21 includes two AND circuits 211, 212, an OR circuit 213, and a NOT circuit 214. The unit circuit 22 includes two AND circuits 221, 222, an OR circuit 223, and a NOT circuit 224.

The AND circuit 211 includes two input terminals 2111, 2112 and an output terminal 2113. The input terminal 2111 is a terminal through which the comparative data element D31 is input to the second multiplexer 2. The input terminal 2112 is a terminal through which the select signal S1 is input to the second multiplexer 2. The output terminal 2113 is connected to an input terminal 2131 of the OR circuit 213.

The AND circuit 212 includes two input terminals 2121, 2122 and an output terminal 2123. The input terminal 2121 is a terminal through which the comparative data element D32 is input to the second multiplexer 2. The input terminal 2122 is connected to the output terminal 2142 of the NOT circuit 214. The output terminal 2123 is connected to an input terminal 2132 of the OR circuit 213.

The OR circuit 213 includes two input terminals 2131, 2132 and an output terminal 2133. The input terminal 2131 is connected to the output terminal 2113 of the AND circuit 211 as described above. The input terminal 2132 is connected to the output terminal 2123 of the AND circuit 212 as described above. The output terminal 2133 is connected to an input terminal 2221 of the AND circuit 222 of the unit circuit 22.

The NOT circuit 214 includes an input terminal 2141 and an output terminal 2142. The input terminal 2141 is a terminal through which the select signal S1 is input to the second multiplexer 2. The output terminal 2142 is connected to the input terminal 2122 of the AND circuit 212 as described above.

The AND circuit 221 includes two input terminals 2211, 2212 and an output terminal 2213. The input terminal 2211 is a terminal through which the comparative data element D33 is input to the second multiplexer 2. The input terminal 2212 is a terminal through which the select signal S2 is input to the second multiplexer 2. The output terminal 2213 is connected to an input terminal 2231 of the OR circuit 223.

The AND circuit 222 includes two input terminals 2221, 2222 and an output terminal 2223. The input terminal 2221 is connected to the output terminal 2133 of the OR circuit 213 of the unit circuit 21. The input terminal 2222 is connected to the output terminal 2242 of the NOT circuit 224. The output terminal 2223 is connected to an input terminal 2232 of the OR circuit 223.

The OR circuit 223 includes two input terminals 2231, 2232 and an output terminal 2233. The input terminal 2231 is connected to the output terminal 2213 of the AND circuit 221 as described above. The input terminal 2232 is connected to the output terminal 2223 of the AND circuit 222 as described above. The output terminal 2233 is a terminal through which the result data element D4 is output from the second multiplexer 2.

The NOT circuit 224 includes an input terminal 2241 and an output terminal 2242. The input terminal 2241 is a terminal through which the select signal S2 is input to the second multiplexer 2. The output terminal 2242 is connected to the input terminal 2222 of the AND circuit 222 as described above.

The second multiplexer 2 made up of the two unit circuits 21, 22 is mounted, along with the first multiplexer 1 and the plurality of comparator circuits 31, on the printed wiring board as described above.

In this case, in the diagnosis circuit 10 according to this embodiment, the number of the comparative data elements D3 to be supplied to the second multiplexer 2 is three as described above. On the other hand, the number of the unit circuits that form the second multiplexer 2 is two. Meanwhile, if the number of the comparative data elements to be supplied to the second multiplexer 2 is two, then the number of the unit circuits that form the second multiplexer 2 is one. That is to say, every time the number of the comparative data elements D3 to be supplied to the second multiplexer 2 increases by one, the number of the unit circuits also increases by one. Therefore, every time the number of the comparative data elements D3 to be supplied to the second multiplexer 2 increases, the mounting area of the second multiplexer 2 on the printed wiring board also increases.

Generally speaking, in a multiplexer such as the second multiplexer 2, every time the number of bits of data to be supplied to the multiplexer increases, the number of the unit circuits that form the multiplexer also increases, thus causing an increase in the mounting area of the multiplexer on a printed wiring board.

Thus, if a failure diagnosis of the first multiplexer is made by comparing the respective outputs of the first multiplexer and the second multiplexer with each other (in a comparative example), for example, the data supplied to the first multiplexer is also supplied to the second multiplexer, thus causing an increase in the number of bits of the data supplied to the second multiplexer and an increase in the mounting area of the second multiplexer on the printed wiring board as well. As a result, this causes a significant increase in the size of the diagnosis circuit and eventually the size of the electronic device including the diagnosis circuit.

In contrast, the diagnosis circuit 10 and electronic device 100 according to this embodiment are configured to supply the comparative data element D3 of 1 bit to the second multiplexer 2 as described above. Thus, compared to a configuration in which the respective outputs of the first multiplexer and the second multiplexer are compared with each other (comparative example), the number of bits of the data to be supplied to the second multiplexer 2 may be reduced, and therefore, the size of the second multiplexer 2 may be reduced. This enables reducing the mounting area of the second multiplexer 2 on the printed wiring board. Consequently, this embodiment may contribute to reducing the size of the diagnosis circuit 10 including the second multiplexer 2 and eventually the size of the electronic device 100 including the diagnosis circuit 10.

In this case, the number of the comparative data elements D3 to be supplied to the second multiplexer 2 is suitably equal to or greater than ten. This may reduce, compared to a situation where a failure diagnosis of the first multiplexer is made by comparing the respective outputs of the first multiplexer and the second multiplexer with each other, the mounting area of the diagnosis circuit 10 on the printed wiring board by 20% or more. As used herein, the mounting area of the diagnosis circuit 10 on the printed wiring board includes not only the respective mounting areas of the second multiplexer 2 and the plurality of comparator circuits 31 but also the mounting area of the wiring between the plurality of comparator circuits 31 and the second multiplexer 2 as well.

(3) Operation

Figure 3:
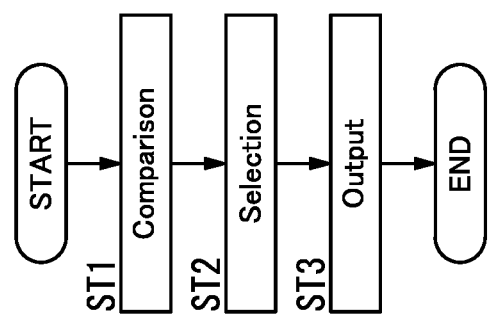
FIG. 3 is a flowchart showing how the diagnosis circuit operates.

Next, it will be described with reference to FIG. 3 how the diagnosis circuit 10 according to this embodiment operates.

First, each of the plurality of comparator circuits 31 compares a corresponding input data element D1, out of the plurality of input data elements D1, with the selected data element D2 (in a comparison step ST1). More specifically, the comparator circuit 31A compares the input data element D11 with the selected data element D2 and outputs, as the result of comparison, a comparative data element D31 to the second multiplexer 2. The comparator circuit 31B compares the input data element D12 with the selected data element D2 and outputs, as the result of comparison, a comparative data element D32 to the second multiplexer 2. The comparator circuit 31C compares the input data element D13 with the selected data element D2 and outputs, as the result of comparison, a comparative data element D33 to the second multiplexer 2.

The second multiplexer 2 selects one comparative data element D3 out of the three comparative data elements D3 in response to the select signals S1, S2 supplied from the control circuit described above (in a selection step ST2). In this case, each of the select signals S1, S2 is a 1-bit signal, which is either 0 or 1. If the select signal S1 is 1 and the select signal S2 is 0, then the second multiplexer 2 selects the comparative data element D31. If the select signal S1 is 0 and the select signal S2 is 0, then the second multiplexer 2 selects the comparative data element D32. If the select signal S1 is 0 and the select signal S2 is 1, then the second multiplexer 2 selects the comparative data element D33. Then, the second multiplexer 2 outputs the comparative data element D3, selected in the selection step ST2, as the result data element D4 (in an output step ST3). In this manner, the second multiplexer 2 sequentially outputs the comparative data elements D3, which are sequentially selected in response to the select signals S1, S2, as the result data elements D4.

That is to say, the diagnosis method according to this embodiment is a method for making a diagnosis of the first multiplexer 1 using the diagnosis circuit 10. The first multiplexer 1 receives a plurality of input data elements D1 (D11, D12, D13), selects one of the plurality of input data elements D1, and outputs the one input data element D1 as a selected data element D2. This diagnosis method includes a comparison step ST1 and an output step ST3. The comparison step ST1 includes making the diagnosis circuit 10 compare each of the plurality of input data elements D1 to be supplied to the first multiplexer 1 with the selected data element D2 provided by the first multiplexer 1. The output step ST3 includes making the diagnosis circuit 10 output, out of a plurality of comparative data elements D3 corresponding one to one to a plurality of results of comparison made in the comparison step ST1 with respect to the plurality of input data elements D1, a comparative data element D3, including a result of comparison between the one input data element D1 selected by the multiplexer 1 and the selected data element D2, as a result data element D4.

(4) Advantages

The diagnosis circuit 10 according to this embodiment is configured such that the plurality of comparative data elements D3 indicating the results of comparison made by the comparator unit 3 are supplied to the second multiplexer 2 as described above. Each of the plurality of comparative data elements D3 is data of 1 bit as described above. On the other hand, each of the plurality of input data elements D1 to be supplied to the first multiplexer 1 is data of 20 bits as described above. Thus, the diagnosis circuit 10 according to this embodiment may reduce, compared to a situation where input data of 20 bits is supplied to the second multiplexer and the respective outputs of the first multiplexer and the second multiplexer are compared with each other (comparative example), the size of the second multiplexer 2. This may contribute to reducing the size of the diagnosis circuit 10 including the second multiplexer 2 and eventually the size of the electronic device 100 including the diagnosis circuit 10. Particularly if the number of the input data elements D1 is equal to or greater than ten, the mounting area of the second multiplexer 2 on the printed wiring board may be reduced by 20% or more.

Furthermore, in the diagnosis circuit 10 according to this embodiment, the plurality of input data elements D1 correspond one to one to the plurality of comparator circuits 31 as described above. That is to say, the number of the input data elements D1 is the same as the number of the comparator circuits 31. This allows the plurality of input data elements D1 to be compared with the selected data element D2 simultaneously. Consequently, this may shorten the time it takes to perform the processing of comparing the input data elements D1 with the selected data element D2, compared to a situation where the number of the plurality of input data elements is larger than the number of the comparator circuits.

In addition, in the diagnosis circuit 10 according to this embodiment, the select signals S1, S2 supplied to the first multiplexer 1 when the selected data element D2 is selected from the plurality of input data elements D1 are the same as the select signals S1, S2 supplied to the second multiplexer 2 when the result data element D4 is selected from the plurality of comparative data elements D3. This enables, at the timing of outputting the selected data element D2 from the first multiplexer 1, determining, based on this selected data element D2, whether or not the first multiplexer 1 is operating properly.

(5) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Next, variations of the exemplary embodiment will be enumerated one after another. Note that the variations to be described below may be adopted in combination as appropriate.

In the embodiment described above, the number of the input data elements supplied to the first multiplexer 1 is supposed to be three. However, this is only an example and should not be construed as limiting. Alternatively, the number of the input data elements supplied to the first multiplexer 1 may also be one, two, or even four or more. Even in any of those cases, the mounting area of the second multiplexer 2 on the printed wiring board may also be reduced, compared to a situation where the respective outputs of the first multiplexer and the second multiplexer are compared with each other (comparative example). This may contribute to reducing the size of the diagnosis circuit 10.

As described above, if the number of the input data elements supplied to the first multiplexer 1 is ten or more, then the mounting area of the second multiplexer 2 on the printed wiring board may be reduced by 20% or more, compared to a situation where the respective outputs of the first multiplexer and the second multiplexer are compared with each other (comparative example). This may contribute to further reducing the size of diagnosis circuit 10 compared to a situation where the number of the input data elements supplied to the first multiplexer is less than ten.

In the embodiment described above, the number of bits of each of the plurality of input data elements D1 is supposed to be 20. However, this is only an example and should not be construed as limiting. Alternatively, the number of bits of each of the plurality of input data elements D1 may also be 30, 50, 100, or any other number.

Furthermore, in the embodiment described above, the number of the input data elements D1 is supposed to be the same as the number of the comparator circuits 31. Alternatively, the number of the input data elements D1 may be different from the number of the comparator circuits 31. More specifically, the number of the comparator circuits 31 may be smaller than the number of the input data elements D1.

(Aspects)

The exemplary embodiment and its variations described above are specific implementations of the following aspects of the present disclosure.

A diagnosis circuit (10) according to a first aspect is configured to make a diagnosis of a first multiplexer (1). The first multiplexer (1) receives a plurality of input data elements (D1), selects one input data element (D1) out of the plurality of input data elements (D1), and outputs the one input data element (D1) as a selected data element (D2). The diagnosis circuit (10) includes a comparator unit (3) and a second multiplexer (2). The comparator unit (3) compares each of the plurality of input data elements (D1) to be supplied to the first multiplexer (1) with the selected data element (D2) provided by the first multiplexer (1). The second multiplexer (2) receives a plurality of comparative data elements (D3) corresponding one to one to a plurality of results of comparison made by the comparator unit (3) with respect to the plurality of input data elements (D1) and outputs, out of the plurality of comparative data elements (D3), a comparative data element (D3), including a result of comparison between the one input data element (D1) selected by the first multiplexer (1) and the selected data element (D2), as a result data element (D4).

This aspect may contribute to reducing the size of the diagnosis circuit (10).

In a diagnosis circuit (10) according to a second aspect, which may be implemented in conjunction with the first aspect, the comparator unit (3) includes a plurality of comparator circuits (31). The plurality of comparator circuits (31) correspond one to one to the plurality of input data elements (D1). Each of the plurality of comparator circuits (31) compares a corresponding input data element (D1) out of the plurality of input data elements (D1) with the selected data element (D2) and outputs a result of comparison with respect to the corresponding input data element (D1).

This aspect may shorten the time it takes to perform the processing of comparing the input data element (D1) with the selected data element (D2).

In a diagnosis circuit (10) according to a third aspect, which may be implemented in conjunction with the first or second aspect, each of the plurality of input data elements (D1) is data of n1 bits, where n1 is a natural number equal to or greater than 2, and each of the plurality of comparative data elements (D3) is data of n2 bits, where n2 is a natural number smaller than n1.

This aspect may contribute to reducing the size of the diagnosis circuit (10).

In a diagnosis circuit (10) according to a fourth aspect, which may be implemented in conjunction with the third aspect, each of the plurality of comparative data elements (D3) is data of 1 bit.

This aspect may contribute to reducing the size of the diagnosis circuit (10).

An electronic device (100) according to a fifth aspect includes a first multiplexer (1) and a diagnosis circuit (10). The first multiplexer (1) receives a plurality of input data elements (D1), selects one input data element (D1) out of the plurality of input data elements (D1), and outputs the one input data element (D1) as a selected data element (D2). The diagnosis circuit (10) makes a diagnosis of the first multiplexer (1). The diagnosis circuit (10) includes a comparator unit (3) and a second multiplexer (2). The comparator unit (3) compares each of the plurality of input data elements (D1) to be supplied to the first multiplexer (1) with the selected data element (D2) provided by the first multiplexer (1). The second multiplexer (2) receives a plurality of comparative data elements (D3) corresponding one to one to a plurality of results of comparison made by the comparator unit (3) with respect to the plurality of input data elements (D1) and outputs, out of the plurality of comparative data elements (D3), a comparative data element (D3), including a result of comparison between the one input data element (D1) selected by the first multiplexer (1) and the selected data element (D2), as a result data element (D4).

The electronic device (100) according to this aspect includes the diagnosis circuit (10). Thus, this aspect may contribute to reducing the size of the electronic device (100).

In an electronic device (100) according to a sixth aspect, which may be implemented in conjunction with the fifth aspect, a select signal (S1, S2) supplied to the first multiplexer (1) when the selected data element (D2) is selected from the plurality of input data elements (D1) and a select signal (S1, S2) supplied to the second multiplexer (2) when the result data element (D4) is selected from the plurality of comparative data elements (D3) are the same signal.

This aspect enables, at the timing of outputting the selected data element (D2) from the first multiplexer (1), determining, based on the selected data element (D2), whether or not the first multiplexer (1) is operating properly.

In an electronic device (100) according to a seventh aspect, which may be implemented in conjunction with the fifth or sixth aspect, the number of the plurality of input data elements (D1) is equal to or greater than ten.

This aspect may contribute to further reducing the size of the electronic device (100), compared to a situation where the number of the plurality of input data elements (D1) is less than ten.

A diagnosis method according to an eighth aspect is a method for making a diagnosis of a multiplexer (1) using a diagnosis circuit (10). The multiplexer (1) receives a plurality of input data elements (D1), selects one input data element (D1) out of the plurality of input data elements (D1), and outputs the one input data element (D1) as a selected data element (D2). The diagnosis method includes a comparison step (ST1) and an output step (ST3). The comparison step (ST1) includes making the diagnosis circuit (10) compare each of the plurality of input data elements (D1) to be supplied to the multiplexer (1) with the selected data element (D2) provided by the multiplexer (1). The output step (ST3) includes making the diagnosis circuit (10) output, out of a plurality of comparative data elements (D3) corresponding one to one to a plurality of results of comparison made in the comparison step (ST1) with respect to the plurality of input data elements (D1), a comparative data element (D3), including a result of comparison between the one input data element (D1) selected by the multiplexer (1) and the selected data element (D2), as a result data element (D4).

This aspect may contribute to reducing the size of the diagnosis circuit (10).

Note that the constituent elements according to the second to fourth aspects are not essential constituent elements for the diagnosis circuit (10) but may be omitted as appropriate.

Note that the constituent elements according to the sixth and seventh aspects are not essential constituent elements for the electronic device (100) but may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A diagnosis circuit configured to make a diagnosis of a first multiplexer, the first multiplexer being configured to receive a plurality of input data elements, select one input data element out of the plurality of input data elements, and output the one input data element as a selected data element, the diagnosis circuit comprising:
   a comparator unit configured to compare each of the plurality of input data elements with the selected data element provided by the first multiplexer; and
   a second multiplexer configured to receive a plurality of comparative data elements corresponding one to one to a plurality of results of comparison made by the comparator unit with respect to the plurality of input data elements and output, out of the plurality of comparative data elements, a comparative data element corresponding to the one input data element selected by the first multiplexer as a result data element.

2. The diagnosis circuit of claim 1, wherein
   the comparator unit includes a plurality of comparator circuits corresponding one to one to the plurality of input data elements, and
   each of the plurality of comparator circuits is configured to compare a corresponding input data element out of the plurality of input data elements with the selected data element and output a result of comparison with respect to the corresponding input data element, which is one of a plurality of results of comparisons.

3. The diagnosis circuit of claim 1, wherein
   each of the plurality of input data elements is data of n1 bits, where n1 is a natural number equal to or greater than 2, and
   each of the plurality of comparative data elements is data of n2 bits, where n2 is a natural number smaller than n1.

4. The diagnosis circuit of claim 3, wherein each of the plurality of comparative data elements is data of 1 bit.

5. An electronic device comprising:
 a first multiplexer configured to receive a plurality of input data elements, select one input data element out of the plurality of input data elements, and output the one input data element as a selected data element; and
 a diagnosis circuit configured to make a diagnosis of the first multiplexer, the diagnosis circuit comprising:
 a comparator unit configured to compare each of the plurality of input data elements with the selected data element provided by the first multiplexer; and
 a second multiplexer configured to receive a plurality of comparative data elements corresponding one to one to a plurality of results of comparison made by the comparator unit with respect to the plurality of input data elements and output, out of the plurality of comparative data elements, a comparative data element corresponding to the one input data element selected by the first multiplexer as a result data element.

6. The electronic device of claim 5, wherein a select signal is supplied to the first multiplexer when the selected data element is selected from the plurality of input data elements and the select signal is supplied to the second multiplexer when the result data element is selected from the plurality of comparative data elements.

7. The electronic device of claim 5, wherein a numerical number of the plurality of input data elements is equal to or greater than ten.

8. A diagnosis method for making a diagnosis of a multiplexer using a diagnosis circuit, the multiplexer being configured to receive a plurality of input data elements, select one input data element out of the plurality of input data elements, and output the one input data element as a selected data element, the diagnosis method comprising:
 a comparison step including making the diagnosis circuit compare each of the plurality of input data elements with the selected data element provided by the multiplexer; and
 an output step including making the diagnosis circuit output, out of a plurality of comparative data elements corresponding one to one to a plurality of results of comparison made in the comparison step with respect to the plurality of input data elements, a comparative data element corresponding to the one input data element selected by the multiplexer as a result data element.

* * * * *